United States Patent [19]

Eden et al.

[11] Patent Number: 5,329,004
[45] Date of Patent: Jul. 12, 1994

[54] METHOD OF MANUFACTURING CIGARETTES USING HIGH AMYLOPECTIN STARCH PHOSPHATE MATERIAL AS AN ADHESIVE

[75] Inventors: James L. Eden, East Milestone, N.J.; John W. Walker, Lane Cove, Australia

[73] Assignee: National Starch and Chemical Investment Holding Corporation, Wilmington, Del.

[21] Appl. No.: 974,844

[22] Filed: Nov. 23, 1992

Related U.S. Application Data

[63] Continuation-in-part of Ser. No. 806,568, Dec. 12, 1991, abandoned.

[51] Int. Cl.$^5$ .............. C08B 31/02; C08B 33/02; C08B 35/02; C09J 4/00
[52] U.S. Cl. .............. 536/109; 106/210; 106/213; 156/336; 131/35; 131/284
[58] Field of Search ............. 536/109; 106/210, 213; 156/336; 523/105; 131/105, 35, 284, 37, 69, 90; 127/32, 33, 67, 70, 71

[56] References Cited

U.S. PATENT DOCUMENTS

| | | | |
|---|---|---|---|
| 2,582,198 | 1/1952 | Etheridge | 127/28 |
| 2,884,412 | 4/1957 | Neukom | 536/109 |
| 3,424,613 | 1/1969 | Huber et al. | 127/28 |
| 3,553,195 | 1/1971 | Jarowenko | 536/109 |
| 3,637,407 | 1/1972 | Schobinger et al. | 106/213 |
| 3,642,774 | 2/1972 | Schobinger et al. | 536/109 |
| 4,166,173 | 8/1979 | Wurzberg et al. | 539/109 |
| 4,216,310 | 8/1980 | Wurzberg et al. | 536/109 |
| 4,256,771 | 3/1981 | Henderson et al. | 426/250 |
| 5,085,228 | 2/1992 | Mooney et al. | 131/37 |

FOREIGN PATENT DOCUMENTS 57-11579 3/1982 Japan.

OTHER PUBLICATIONS

H. M. Kennedy, "Starch and Dextrins in Prepared Adhesives", *Starch: Chemistry and Technology*, second edition, 1984, pp. 593-610.

*Starch: Chemistry and Technology*, edited by R. L. Whistler, J. N. Bemiller and F. P. Paschall, second edition, 1984, pp. 349-364, 555-557.

*Modified Starches: Properties and Uses*, edited by O. B. Wurzburg, 1986, pp. 97-112.

Grant and Hackh's Chemical Dictionary, McGraw-Hill Book Co., New York, 1987, p. 552.

Webster's II New Riverside University Dictionary, Houghton Miffin Company, 1988, p. 244.

*Primary Examiner*—Nathan M. Nutter
*Attorney, Agent, or Firm*—Eugene Zagarella, Jr.

[57] ABSTRACT

An adhesive for use in cigarette manufacturing which is a natural based liquid starch phosphate material having good flow or fluidity characteristics and viscosity stability and comprises a phosphorylated starch material made from a fluidity or converted starch having a high amylopectin content, the final starch phosphate composition prepared by steam injection cooking the phosphorylated starch at high temperature and pressure.

12 Claims, No Drawings

METHOD OF MANUFACTURING CIGARETTES USING HIGH AMYLOPECTIN STARCH PHOSPHATE MATERIAL AS AN ADHESIVE

This application is a continuation-in-part of application Ser. No. 07/806,568 filed Dec. 12, 1991 and now abandoned.

BACKGROUND OF THE INVENTION

The present invention is directed to a liquid starch phosphate adhesive composition comprising a selected phosphorylated starch material prepared by steam injection cooking at high temperature and pressure. This starch phosphate composition is a natural adhesive material which is viscosity stable over time and possesses suitable rheological properties making it especially useful as an adhesive in the manufacture of cigarettes.

Cigarettes are generally comprised of a cigarette rod and most often a filter or plug. The cigarette rod consists of a stream of tobacco wrapped in a paper tube, the paper tube being glued along one longitudinal edge with a suitable adhesive (side seam or lap seal). The filter or filter plug generally consists of a crimped textile tow of cellulose acetate fibers treated with a plasticizer and wrapped into a cylindrical form with paper. The center of the paper is attached to the fibers using an adhesive (center-line adhesive) and the paper is then wrapped around the plug rod, overlapping and attaching itself with an adhesive (overlap adhesive) to form the cylindrical filter plug. The filter or plug is then attached to the cigarette rod by wrapping another paper (tipping paper) which contains an adhesive (tipping adhesive) around the plug and overlapping it with an aligned rod.

Most cigarette manufacturing processes involve high speed operations (2000-12000 cigarettes per minute) where the adhesive is typically applied by nozzle (side seaming, center-line and overlap), paste wheel (side seaming) and by rollers (filter tipping). Adhesives used in these operations are generally synthetic emulsions but because of increasing interest and tobacco regulation requirements in different countries, natural type adhesives are being sought to replace the synthetics.

Starch has long been used as an adhesive material in various applications such as case and carton sealing, laminating, tube winding, papermaking, etc., as described in *Starch: Chemistry and Technology*, Second Edition by R. Whistler, J. Bemiller and E. Paschall, 1984, pp. 593-610. Dextrins and thin-boiling starches are disclosed as useful as side seam adhesives but generally at lower solids than being required at current high speed manufacturing operations.

Starch phosphates prepared by phosphorylation reactions of starch, wherein starch is impregnated with a phosphate salt and thereafter dried and heat-reacted are well known in the art, as described in *Modified Starches: Properties and Uses*, edited by O. B. Wurzburg, 1986, pp. 97-112. U.S. Pat. No. 3,642,774 discloses phosphorylating of starch to form starch phosphates, viz: low molecular weight, highly water soluble dextrin phosphates and further describes various uses for these compositions including for the surface sizing and coating of paper and as adhesives. U.S. Pat. No. 3,637,407 discloses a similar dextrin phosphate composition containing a small proportion of ketene dimer, the composition being especially useful in surface sizing paper.

The cooking of starch at high temperature and pressure in continuous operations is well known as disclosed in Whistler noted above and on pages 555-557. One such method disclosed in Japanese Patent No. 57-11579, published Mar. 5, 1982, involves continuous adhesive manufacturing of natural or synthetic adhesive materials using high pressure heating and forced stirring. Other methods are disclosed in U.S. Pat. Nos. 2,582,198; 3,424,613 and 4,256,771.

However, despite continued developments and improvements for adhesive properties and technological advances in the manufacturing techniques for producing adhesives, there still is the need for a natural adhesive material which will satisfy the requirements of current cigarette production. This has not been easy to accomplish particularly because of the demanding high speed operation and the required properties that adhesive materials used in these operations must possess including flow or fluidity, drying speed, cohesiveness, bonding strength, viscosity stability, humidity resistance, machinability and other rheological characteristics.

SUMMARY OF THE INVENTION

This invention relates to an adhesive for use in cigarette manufacturing which is a natural based starch material that is viscosity stable over time, has suitable flow or fluidity characteristics and provides dry-strength and humidity resistance as well as other needed rheological properties. This adhesive comprises a selected liquid starch phosphate composition which is a phosphorylated starch material made from a fluidity or converted starch having a high amylopectin content, the final starch phosphate composition prepared by steam injection cooking the phosphorylated starch at high temperature and pressure, and having a solids content of greater than 25%.

More particularly, this invention is directed to an adhesive especially useful in cigarette manufacturing comprising a phosphorylated starch material having from about 0.38 to 1.0% bound phosphate and made from a fluidity or converted starch selected from the group consisting of cereal starches containing about 90% or more by weight of amylopectin content, the final starch phosphate composition prepared by steam injection cooking the phosphorylated starch at a temperature of at least about 110° C. using pressure of at least about 5 psig, the adhesive having a solids content of greater than 25%, preferably greater than 30%.

This invention also involves the method of manufacturing cigarettes wherein the natural adhesive starch phosphate composition, defined above, is used as the adhesive particularly in the side seaming operation.

DETAILED DESCRIPTION OF THE INVENTION

The natural starch phosphate composition prepared and used as an adhesive in cigarette manufacturing in accordance with this invention must satisfy the demands and requirements of high speed operations, typically greater than 6000 cigarettes per minute. In order to accomplish this, an adhesive composition having a particular starch phosphate composition and method of preparation has been found.

The base starch starting material used in this invention is a fluidity or converted starch having a high amylopectin content. More particularly, the starch used as the base material will be a cereal starch having an amylopectin content of about 90% or more by weight, preferably about 95% or more. Starches of this type include waxy maize, waxy rice and waxy sorghum. The preferred starch is waxy maize. Fluidity or converted starches are typically starches which are acid converted, although other chemical conversions such as enzyme conversion and oxidation may also be used. These starches are generally identified by their fluidity or WF (water fluidity) number which is an inverse viscosity measurement or measure of the degree of degradation of the starch. The higher the fluidity number (WF), the more degraded the starch and the thinner the viscosity. The measurement for "water fluidity" (WF) as described herein is made using a Thomas Rotational Shear-Type Viscometer (manufactured by Arthur H. Thomas Co., Philadelphia, Pa.) in accordance with standard procedures such as disclosed in U.S. Pat. No. 4,499,116 issued Feb. 12, 1985 to Zwiercan, et al. Useful acid-converted starches will have a water fluidity (WF) of from about 40 to 90, preferably from about 75 to 88. Preparation of acid-converted starches follows conventional techniques where the starch base is treated with an acid, such as hydrochloric or sulfuric acid at a temperature, e.g., 20° to 55° C. for the length of time required to obtain the thinned starch that is sought.

The selected fluidity or converted starch materials are phosphorylated by reaction with phosphate salts in either wet or dry processes in accordance with well known procedures as described in Wurzburg, supra; *Starch: Chemistry and Technology*, Second Edition, R. W. Whistler, J. Bemiller and E. Paschall, 1988, pp. 349–364 and U.S. Pat. No. 4,216,310. A preferred method involves impregnating starch with a phosphate salt, such as sodium tripolyphosphate, and then drying and heat reacting. The prepared phosphorylated starch materials for use in this invention will have molecularly bound phosphate content of at least about 0.38%, preferably from about 0.4 to 1.0% and more preferably from about 0.45% to 0.5%.

While various thermal processes have been used in preparing starches, in order to prepare the starch adhesives of this invention having the required property characteristics, it is necessary to use a particular thermal cooking process involving a high temperature, super atmospheric steam injection cooking operation. This method involves the use of a jet cooking operation wherein the starch is cooked at high pressure via steam injection to a temperature high enough to thoroughly disperse and cook the starch. Typically a slurry of starch is pumped through a chamber where high-pressure steam is injected to raise the temperature and thoroughly cook the starch. The cooked starch is flashed to atmospheric pressure and the product is collected.

The conditions used in preparing the starches involve steam injection cooking at high temperature and pressure, i.e., a temperature of at least 110° C., more particularly from about 135° to 195° C., preferably from about 145° to 180° C., and pressure of greater than about 5 psig. more particularly from about 30 to 175 psig, preferably from about 50 to 125 psig.

The selected starch adhesives prepared as described above, have properties making them particularly useful in manufacturing of cigarettes, especially those involved in high speed operations. These adhesives have a solids content of at least 25%, preferably at least 30% and a Brookfield viscosity of from about 300 to 10,000 cps at 22.5° C., preferably from about 1,000 to 5,000.

The viscosity, as noted, is determined using a Brookfield viscometer at 20 rpm and 22.5° C. The upper or high solids amount can vary and this amount will be limited or determined by the useful viscosity of the adhesive composition. Another important attribute of the adhesives of this invention is that they are viscosity stable, i.e., they avoid retrogradation and retain their original viscosity to a reasonable degree (i.e., within 10–20%) for a period of at least one month and preferably two or more months. This characteristic gives the adhesives the flexibility needed in satisfying cigarette manufacturing operations.

Several operations are involved in the manufacture of cigarettes as described previously and each of them involves the use of an adhesive. Typically, different adhesives are used in the various manufacturing and assembling steps because of the different property requirements and especially in view of the currently increased production speeds, e.g., greater than 6,000 cigarettes per minute. The starch adhesives prepared in accordance with this invention may be used in any of the cigarette manufacturing steps. They have been found especially useful in the side seaming operations involved in preparing the cigarette rod where the tobacco is wrapped in overlapping paper and in filter tipping where the filter or plug is attached or joined to the cigarette rod by an overlapping paper which longitudinally extends over the filter tip and part of the rod. They also may be used in the formation of the filter plug as a center-line adhesive where the fibers are attached to the paper and as an overlap adhesive where the paper is wrapped around the plug rod attaching to itself in an overlapping manner and forming the cylindrical filter plug.

The invention can be further illustrated by the following examples of preferred embodiments thereof, although it will be understood that these examples are merely for the purposes of illustration and are not intended to limit the scope of the invention. All percents and parts are by weight and temperatures are degrees Celsius unless otherwise indicated. The viscosities of the adhesive were determined using a Brookfield viscometer at 20 rpm and 22.5° C.

EXAMPLE I

A solution of sodium tripolyphosphate (25%) was prepared by adding 125 parts of sodium tripolyphosphate to about 225 parts of water and mixed with a magnetic stirrer. The pH of the solution was kept between 5.0 and 5.5 through addition of concentrated hydrochloric acid and the temperature kept at or below 37° C. with an ice bath. Additional water (150 parts) was added as needed to dissolve the sodium tripolyphosphate.

An acid converted waxy maize starch (1500 g) having a fluidity of 85 WF was slurried in 2250 ml of water and the pH adjusted to 8.9. The slurry was then filtered on a Buchner funnel and the sodium tripolyphosphate solution, prepared above, was poured onto the filter cake. The impregnated cake was air dried overnight and then conveyed to a flash drier where it was dried to a moisture content of 4 to 7%. After drying, the impregnated starch was heat-reacted to a temperature of 160° C. and the resulting phosphorylated starch product had a total phosphorus content of 1.98% and a bound phosphorus content of from 0.44 to 0.5%.

EXAMPLE II

A sample of the phosphorylated starch prepared in Example I was added and cooked in a steam injected jet cooker at a temperature of 160° to 195° C. and a pressure of 75 to 125 psig.

The prepared product had a solids content of 33%, a Brookfield viscosity of 1000 cps at 22.5° C., was viscosity stable over one month and had good flow and tack properties.

EXAMPLE III

In order to demonstrate the usefulness of the starch adhesive compositions in cigarette manufacturing particularly high speed operations, the compositions of Example II were tested as a cigarette side seaming adhesive on a Hauni Protos cigarette making machine which had a Kaymich nozzle applicator mounted thereon. Runs were made which produced acceptable cigarette products at speeds of up to about 10,000 cigarettes per minute.

EXAMPLE IV

As a comparative example, a commercially available acid converted corn starch having a fluidity of 75 WF was modified with sodium tripolyphosphate (8%) as in Example I to provide a phosphorylated starch product having a bound phosphorus content of about 0.53%. This phosphorylated corn starch product was cooked as in Example II in a steam injected jet cooker at a temperature of about 149° C. with the prepared product having a solids content of 29.5%, however, after rapid cooling to room temperature it immediately set to a soft gel indicating it was not useable as a liquid adhesive.

EXAMPLE V

Another comparative example involved the modification of an acid converted tapioca starch having a fluidity of 83 WF with sodium tripolyphosphate as in Example I to provide a phosphorylated tapioca starch product having a bound phosphorus content of about 0.46%. Another sample involved modification of an acid converted potato starch having a fluidity of 80 WF with sodium tripolyphosphate as in Example I to provide a phosphorylated potato starch product having a bound phosphorus content of about 0.45%.

The two noted phosphorylated starch products were cooked as in Example II in a steam injected jet cooker at a temperature of about 149° C. with the prepared product having solids content of 35% (tapioca) and 34% (potato). However, after cooling to room temperature both products set up to a solid within two hours indicating they were not useable as liquid adhesives.

What is claimed is:

1. In the method of manufacturing cigarettes wherein a cigarette rod is formed by wrapping tobacco in a paper tube which is bonded along one longitudinal edge with a side seam adhesive and an optional filter is formed having several adhesive bonds including a center-line adhesive bond where the filter material is attached to plug wrap paper, an overlap adhesive bond where the paper is wrapped around the filter plug and attached to itself in an overlapping manner and a tipping adhesive bond where the filter plug is attached to the cigarette rod by wrapping another paper around the plug and overlapping it with an aligned cigarette rod, the improvement comprising applying as the adhesive in at least one of the side seam, center-line, overlap and tipping bonds, a liquid starch phosphate adhesive composition consisting essentially of a phosphorylated starch material having from about 0.38 to 1.0% of bound phosphate, the starting starch material being a fluidity or converted cereal starch having an amylopectin content of about 90% or more by weight, the final starch phosphate composition prepared by steam injection cooking the phosphorylated starch at a high temperature and pressure, the adhesive having a solids content of greater than 25%.

2. The method of claim 1 wherein the adhesive is applied as the side seaming adhesive.

3. The method of claim 1 wherein the adhesive is applied as the tipping adhesive.

4. The method of claim 1 wherein the starting starch is a waxy starch.

5. The method of claim 1 wherein the fluidity starch is an acid converted starch having a fluidity of from about 40 to 90 WF and the final starch phosphate product is cooked at a temperature of at least about 110° C. and a pressure of at least about 5 psig.

6. The method of claim 5 wherein the starting starch is a waxy starch.

7. The method of claim 6 wherein the adhesive is applied as the side seaming adhesive.

8. The method of claim 7 wherein the starch used in the composition is selected from the group consisting of waxy maize, waxy rice or waxy sorghum.

9. The method of claim 6 wherein the final starch phosphate product is cooked at a temperature of from about 135° to 195° C. and a pressure of from about 30 to 175 psig.

10. The method of claim 9 wherein the adhesive is applied as the side seaming adhesive.

11. The method of claim 5 wherein the phosphorylated starch material has from about 0.45 to 0.5% of bound phosphate.

12. The method of claim 11 wherein the starting starch is a waxy starch and the adhesive is applied as the side seaming adhesive.

* * * * *